(12) United States Patent
Bonko et al.

(10) Patent No.: US 7,637,296 B2
(45) Date of Patent: Dec. 29, 2009

(54) PNEUMATIC DRIVER TIRE FOR TRACKED VEHICLE

(75) Inventors: Mark Leonard Bonko, Uniontown, OH (US); Carl Kenneth Safreed, Jr., Canton, OH (US); Paul John Peterson, Cuyahoga Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 83 days.

(21) Appl. No.: 10/888,205

(22) Filed: Jul. 9, 2004

(65) Prior Publication Data

US 2006/0005907 A1     Jan. 12, 2006

(51) Int. Cl.
*B62D 55/24*    (2006.01)
*B60C 11/03*    (2006.01)

(52) U.S. Cl. .............................. 152/209.8; 152/209.13; 152/209.22; 305/165; 305/173

(58) Field of Classification Search ............. 152/209.8, 152/209.9, 455–456, 209.13, 209.22; D12/505–532; 305/165, 173, 174
See application file for complete search history.

(56) References Cited

U.S. PATENT DOCUMENTS

| | | | | | |
|---|---|---|---|---|---|
| 2,534,869 | A | * | 12/1950 | Jones | ............ 152/209.8 |
| 3,107,128 | A | * | 10/1963 | Ruane | ............ 305/178 |
| 3,880,218 | A | | 4/1975 | Brajenovich et al. | .... 152/209 R |
| T973,007 | I4 | | 8/1978 | Beyers | ............ 15/176 |
| 4,769,203 | A | * | 9/1988 | Tamura et al. | ............ 425/28.1 |
| 5,154,783 | A | * | 10/1992 | Kuhr et al. | ............ 152/209.22 |
| 5,261,474 | A | * | 11/1993 | Lobb et al. | ............ 152/454 |
| 5,323,824 | A | * | 6/1994 | Swift et al. | ............ 152/209.8 |
| 5,327,952 | A | * | 7/1994 | Glover et al. | ............ 152/209.26 |
| 5,363,936 | A | * | 11/1994 | Grawey et al. | ............ 305/170 |
| D413,557 | S | | 9/1999 | Bonko | ............ D12/146 |
| 6,073,668 | A | * | 6/2000 | Iwasaki et al. | ............ 152/209.14 |
| 6,386,652 | B1 | | 5/2002 | Bonko | ............ 305/115 |
| 6,761,196 | B2 | * | 7/2004 | Takubo | ............ 152/209.22 |
| 7,198,337 | B2 | * | 4/2007 | Deckler et al. | ............ 305/195 |

FOREIGN PATENT DOCUMENTS

| | | | | |
|---|---|---|---|---|
| DE | 230523 | | 1/1908 | ............ 63/12 |
| DE | 3720788 | * | 1/1988 | |
| DE | 3901624 | * | 8/1989 | |
| EP | 685353 | * | 5/1995 | |
| GB | 1588575 | * | 4/1981 | |
| JP | 61-249807 | * | 11/1986 | |
| JP | 05-155204 | * | 6/1993 | |

OTHER PUBLICATIONS

Machine translation for German 230523 (no date).*
Translation for Japan 05-155204 (Sep. 2009).*

* cited by examiner

*Primary Examiner*—Steven D Maki
(74) *Attorney, Agent, or Firm*—June E. Rickey

(57) ABSTRACT

A pneumatic drive tire for tracked vehicles is provided having an outer tread surface divided into two zones. The first tread zone has a plurality of lugs and grooves, the grooves may extend across the entire first zone creating soil discharge channels. The soil discharge channels preferably extend into the shoulder. The tire has a second tread zone with no lugs or grooves.

23 Claims, 7 Drawing Sheets

PNEUMATIC DRIVER TIRE FOR TRACKED VEHICLE

TECHNICAL FIELD

The present invention relates to tracked vehicles for agricultural vehicles and the like, and more particularly to a pneumatic drive tire for tracked vehicles.

BACKGROUND OF THE INVENTION

In many agricultural applications the use of vehicles having track systems instead of pneumatic tires is becoming increasingly more popular. These track vehicles use an endless track belt, preferably made of elastomeric material reinforced by cords of steel. The belt has a ground engaging tread surface similar to that found on a tire. The primary benefit to a track system is the increased flotation due to the fact that the tracks can bridge a longer surface area, helping to keep the vehicle afloat.

It is known in the prior art of track vehicles to utilize a pneumatic tire in the drive wheel position. See for example, U.S. Pat. No. 6,386,652 to Bonko, which is hereby incorporated by reference. Pneumatic drive tires are well suited for track applications, and have the advantage of increased flotation, reduced need for vehicle suspension, and the ability to frictionally engage the track under adverse soil conditions such as mud and debris. In a typical rubber track application, two pairs of drive tires are used for each track. Each pair of tires straddles a track center guide lug. As the inner part of the tire shoulder is in close proximity to the center guide lug, wear of the tire shoulder can occur. Under adverse conditions, contact between the tire shoulder area with the center lug guide may result in tearing of the tire lugs or "detracking", which occurs when the track disengages from the drive tires.

SUMMARY OF THE INVENTION

The present invention provides a pneumatic drive tire for a tracked vehicle. The drive tire has a pair of annular beads, a carcass reinforcing structure, and an elastomeric side wall extending radially outwardly from each bead adjacent the carcass reinforcing structure to a radially outer tread. The tread has two tread zones, wherein the first zone has a smooth outer surface, and the second tread zone has a plurality of lugs and a plurality of grooves.

The present invention provides in another aspect of the invention a pneumatic drive tire for a tracked vehicle. The drive tire has a pair of annular beads, a carcass reinforcing structure, and an elastomeric side wall extending radially outwardly from each bead adjacent the carcass reinforcing structure to a radially outer tread. The tread has two tread zones, the first zone has no grooves or lugs, and the second tread zone has a plurality of lugs and a plurality of grooves.

BRIEF DESCRIPTION OF THE DRAWINGS

The advantages of the present invention will be apparent from the following description when read in conjunction with the accompanying drawings in which.

DETAILED DESCRIPTION OF THE INVENTION

Figure 1:
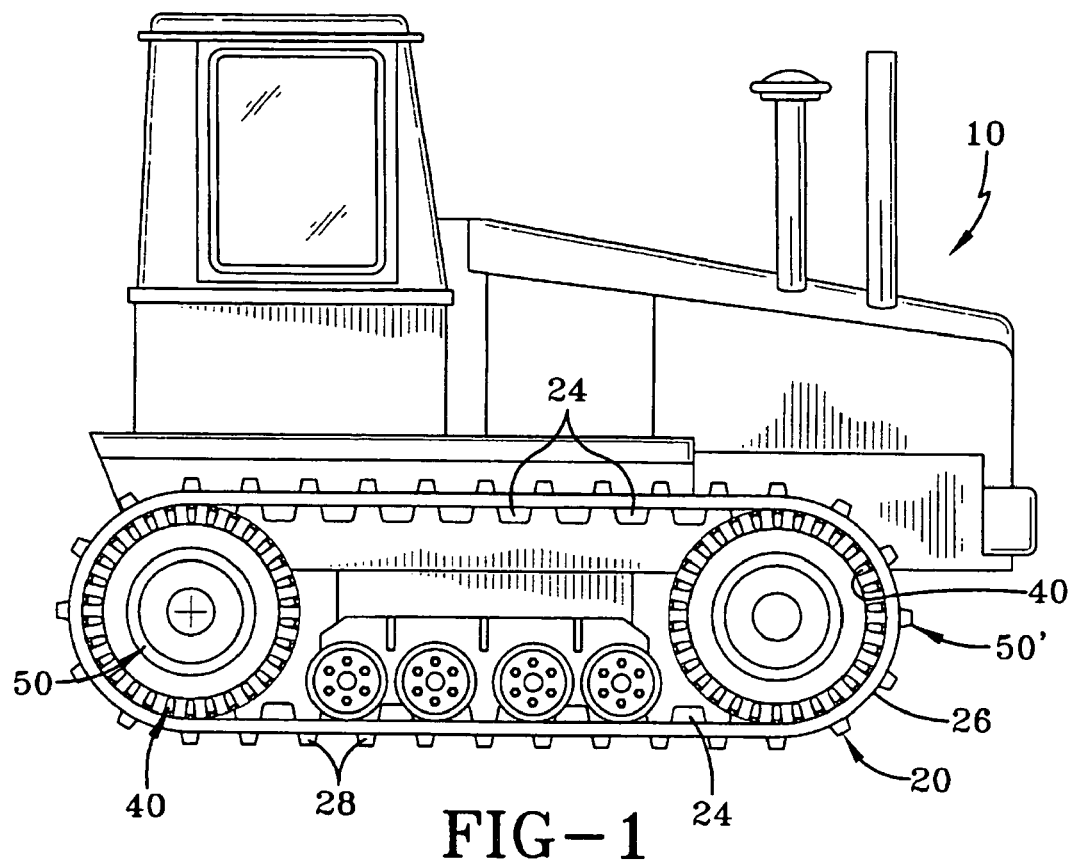
FIG. 1 is a side elevational view of the work vehicle.
Figure 2:
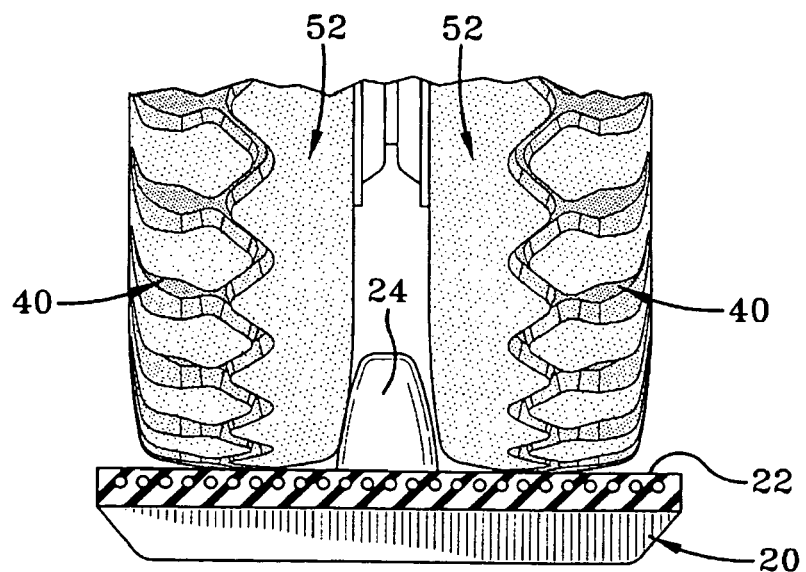
FIG. 2 is a partial cross-sectional view of a preferred drive wheel structure.
Figure 3:
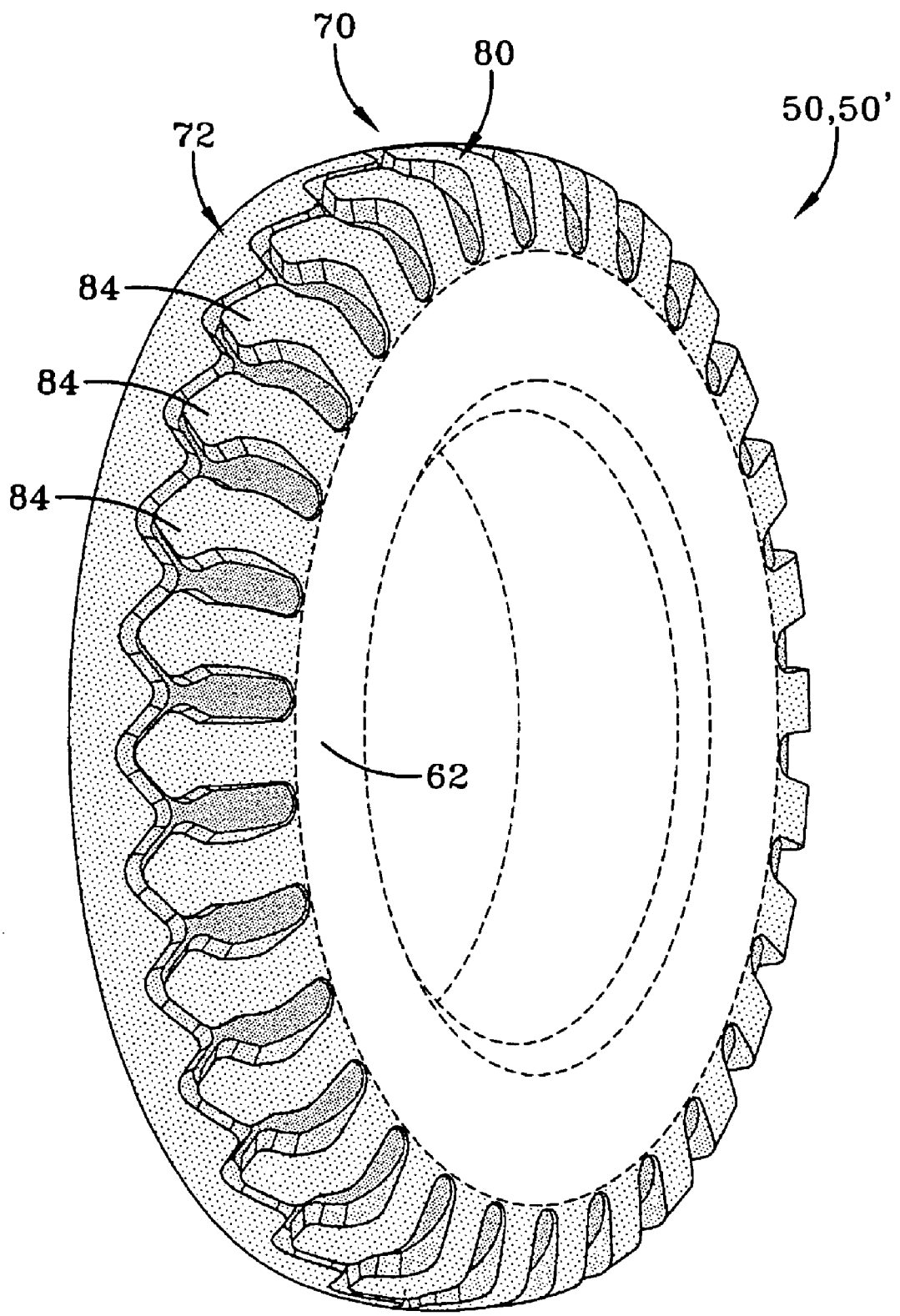
FIG. 3 is a perspective view of the drive tire according to the invention.

FIG. 1 illustrates one example of a type of vehicle which may utilize the drive tire of the present invention. The term "tire" as used herein, means a pneumatic structure mounted upon a wheel which together function as a gear in driving the track of a vehicle. Vehicle 10 has an endless rubber track 20 and a drive wheel assembly 40, which further includes a forward set of drive wheel tires 50 and a rear set of drive wheel tires 50'. Two sets of drive wheel tires 50,50' are axially aligned and mounted in pairs within the endless rubber track 20. The outer tread surface 52 of each of the drive wheel tires are in mating engagement with the interior surface 22 of the endless rubber track. The interior surface 22 is typically smooth, and includes a plurality of center guide lugs 24, spaced apart on equal intervals. Each set of drive tires straddles the center guide lug. The center guide lugs 24 are aligned circumferentially along the center of the track 20. The center guide lugs function to prevent the endless rubber track from slipping over the ends of the drive wheel tires 50,50'. As best shown in FIG. 2, each center guide lug 24 travels in close proximity between each pair of drive tires 50,50'. The endless rubber track may further include an outer tread surface, which may optionally comprise cross bars or lugs 24 for increased traction.

Figure 7A:
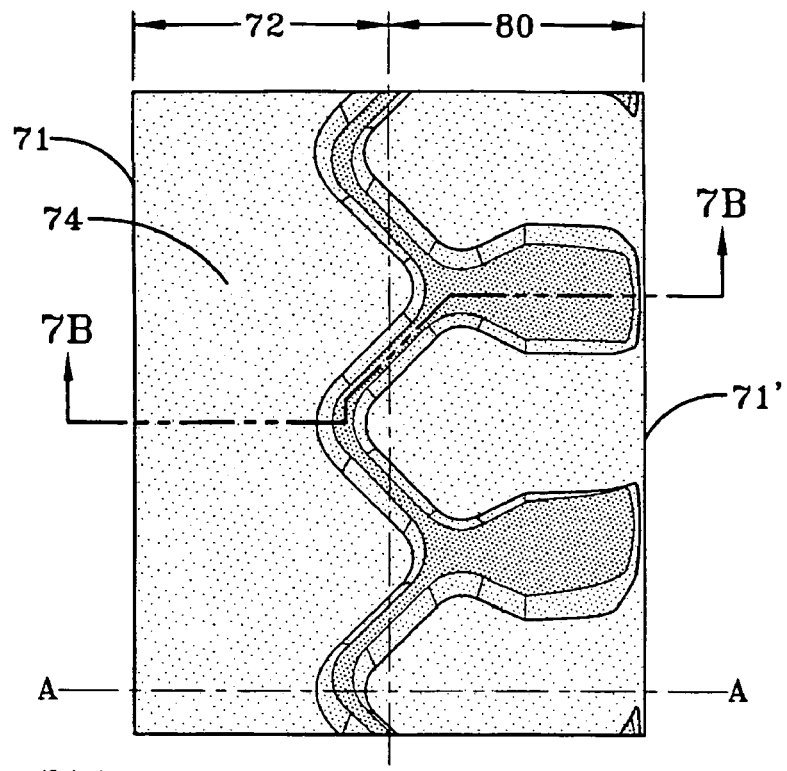
FIG. 7A is an enlarged plan view of the tread of the tire according to the present invention.
Figure 7B:
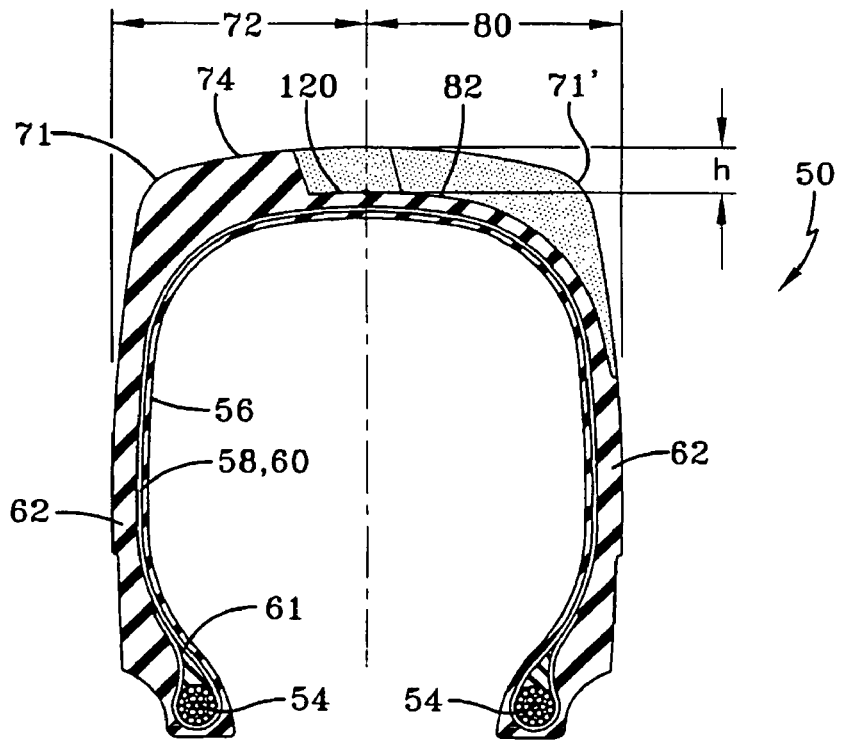
FIG. 7B is a cross sectional view of the tire in FIG. 7A taken along the line 7B-7B.

In FIG. 7B, a cross-sectional view of the tire 50 of the present invention is shown. The tire 50 has a pair of bead cores 54, and a carcass reinforcing structure 56 extending from bead core 54 to bead core 54. The carcass reinforcing structure 56 has two or more plies, a first ply 58 and a second ply 60. Each ply 58,60 is reinforced with cords. The cords of the first ply 58 are oriented equal but opposite relative to cords of the second ply 60. It is preferable that the cured cords are oriented in an angle of between 30 and 40°. Each ply structure 58,60 as shown has a turn up which wraps about the bead core 54. Adjacent to the bead core 54 is a pair of sidewall structures 62. The sidewall structures 62 are generally elastomeric and extend from the beads 54 toward the tread 70. Preferably, the shoulders 71 of the tread and sidewall are radiused. While the bias construction is preferred, a radial construction may also be utilized.

The tread 70 is divided into two tread zones along the circumference of the tire. The first tread zone 72 bounded by centerline and shoulder edge 71 of the tread has an outer surface 74 having no lugs or grooves, which is preferably smooth. The height of the first tread zone 72 corresponds with, or is symmetrical with, the non-skid depth and undertread of the second tread zone 80. The first tread zone 72 comprises in the range of about 25% to about 55% of the tire section width. Preferably, the first tread zone comprises about 35% of the tire section width at line A-A in FIG. 7A. The first tread zone of the tire abuts the shoulder 71 of the sidewall which also has no grooves and is preferably smooth. The first tread zone 72 of the tread is to be located adjacent the guide lug 24 and functions to prevent snagging of the guide lug within the grooves of the tire. Further, the first tread zone 72 provides increased contact area with the track belt, thereby allowing the tire to provide enhanced driving action.

The second tread zone 80 of the tire is also bounded by the centerline and shoulder edge 71. The second tread zone 80 has an inner tread surface 82 and a plurality of tread lugs 84 extending radially outwardly from the inner tread surface 82. The tread lugs 84 may comprise any particular shape, however it is preferred that the lugs be shaped so that the tread is non-directional. The lugs 84 may comprise a lug head 86 and a shoulder portion 88 connected thereto, wherein the lug head 86 is preferably larger than the shoulder portion 88. More preferably, the width of the lug head 86 is in the range of about 1.2 to about 1.6 times the width of the shoulder portion 88. As shown in the drawing as merely one example of the lug shape 86, the lug head may have two or more angled surfaces 89,91 joined together forming a pointed end 93 which may be optionally located on the equatorial plane of the tire.

Disposed between the tread lugs 84 are debris clearing voids or grooves 100. Preferably, one or more of the grooves 100 extend completely across the second tread zone 80, from a first end to a second end. Even more preferably for soil conditions with heavy debris or mud, the one or more of the grooves 100 extend from the second tread zone 80 into the sidewall 62 of the tire, functioning as soil discharge channels. It is preferred that the grooves 100 are wide, and have a width in the range of about 50% to about 100% of the lug base 88 width at the shoulder 71, and most preferably, about 93% of the shoulder lug base width 88.

Figure 4:
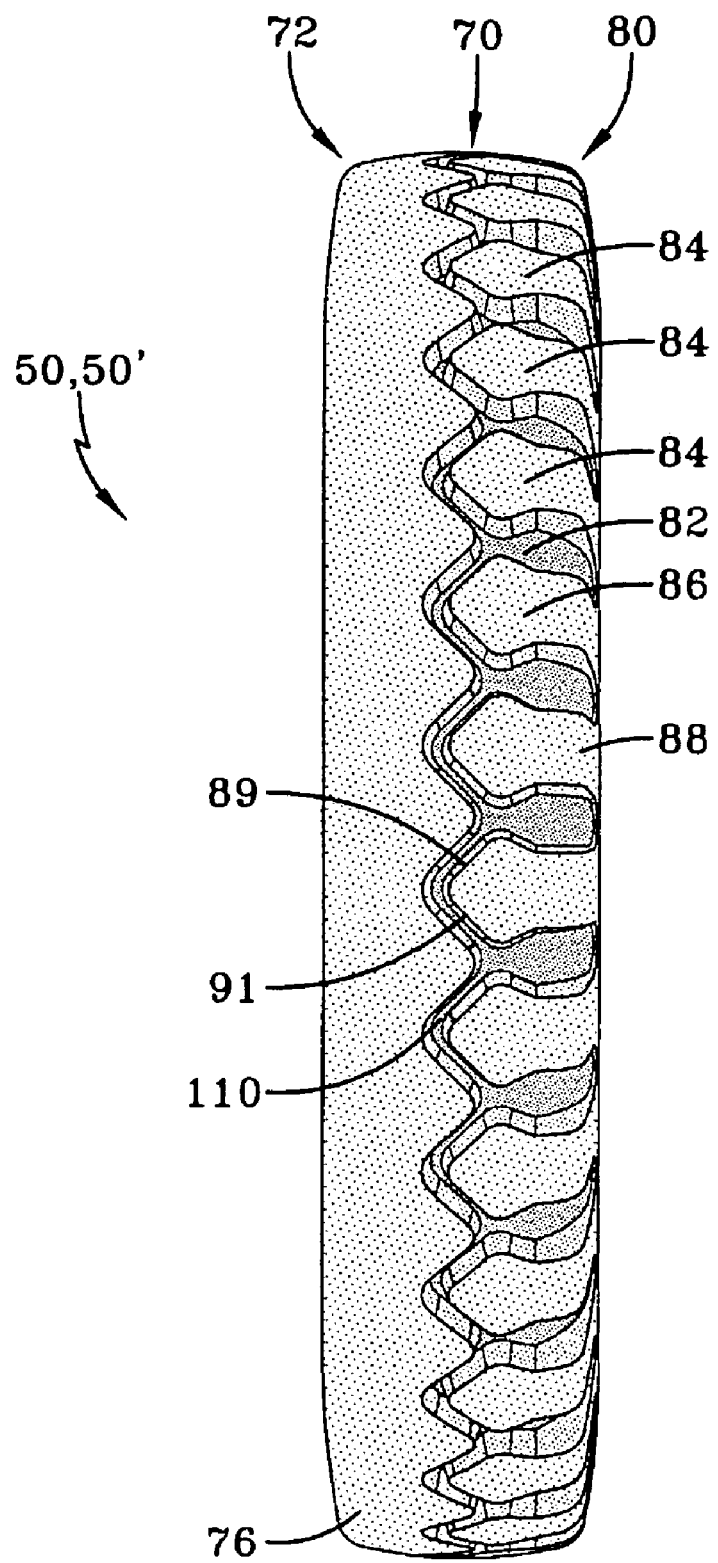
FIG. 4 is a plane view of the drive tire of FIG. 3.
Figure 5:
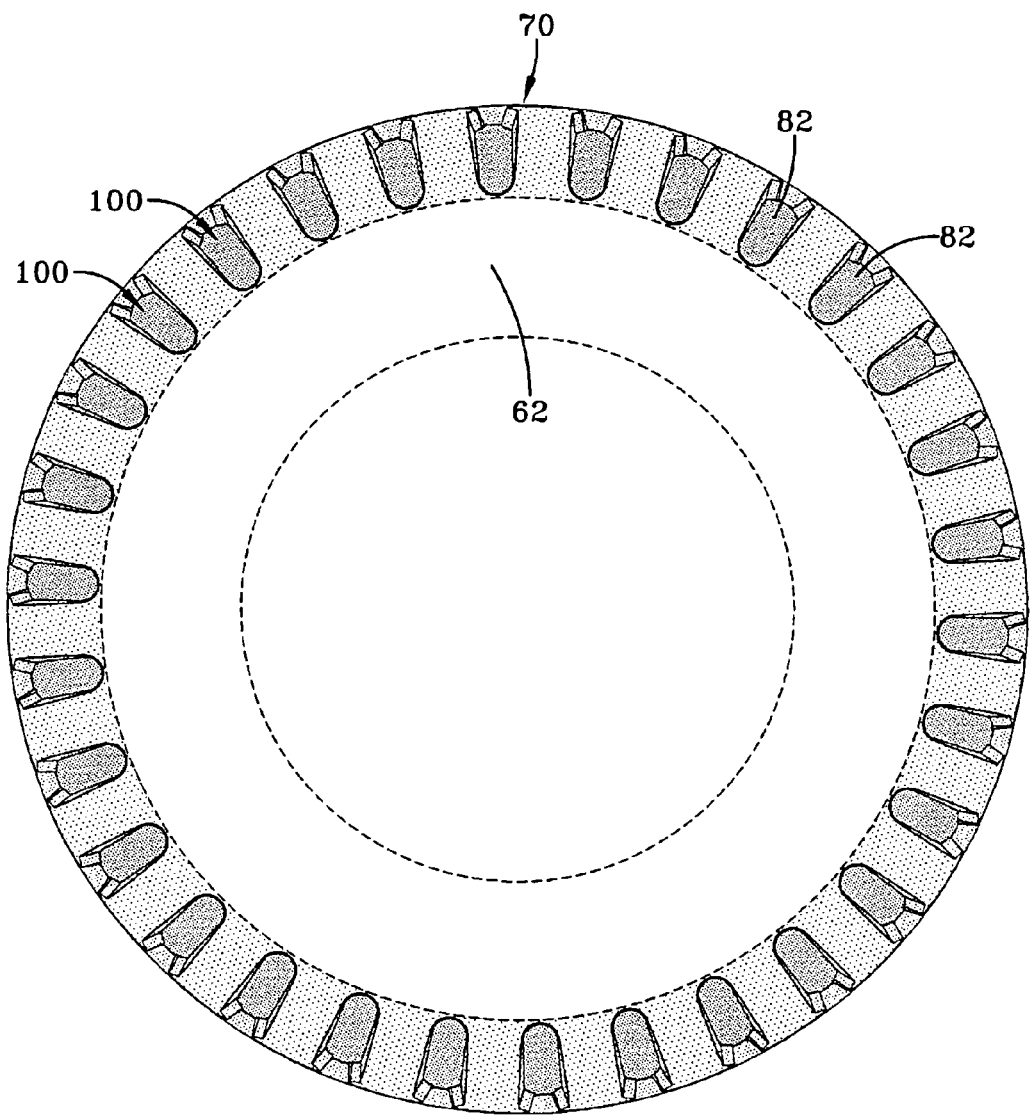
FIG. 5 is a side view of the tire of the present invention according to FIG. 3.
Figure 6:
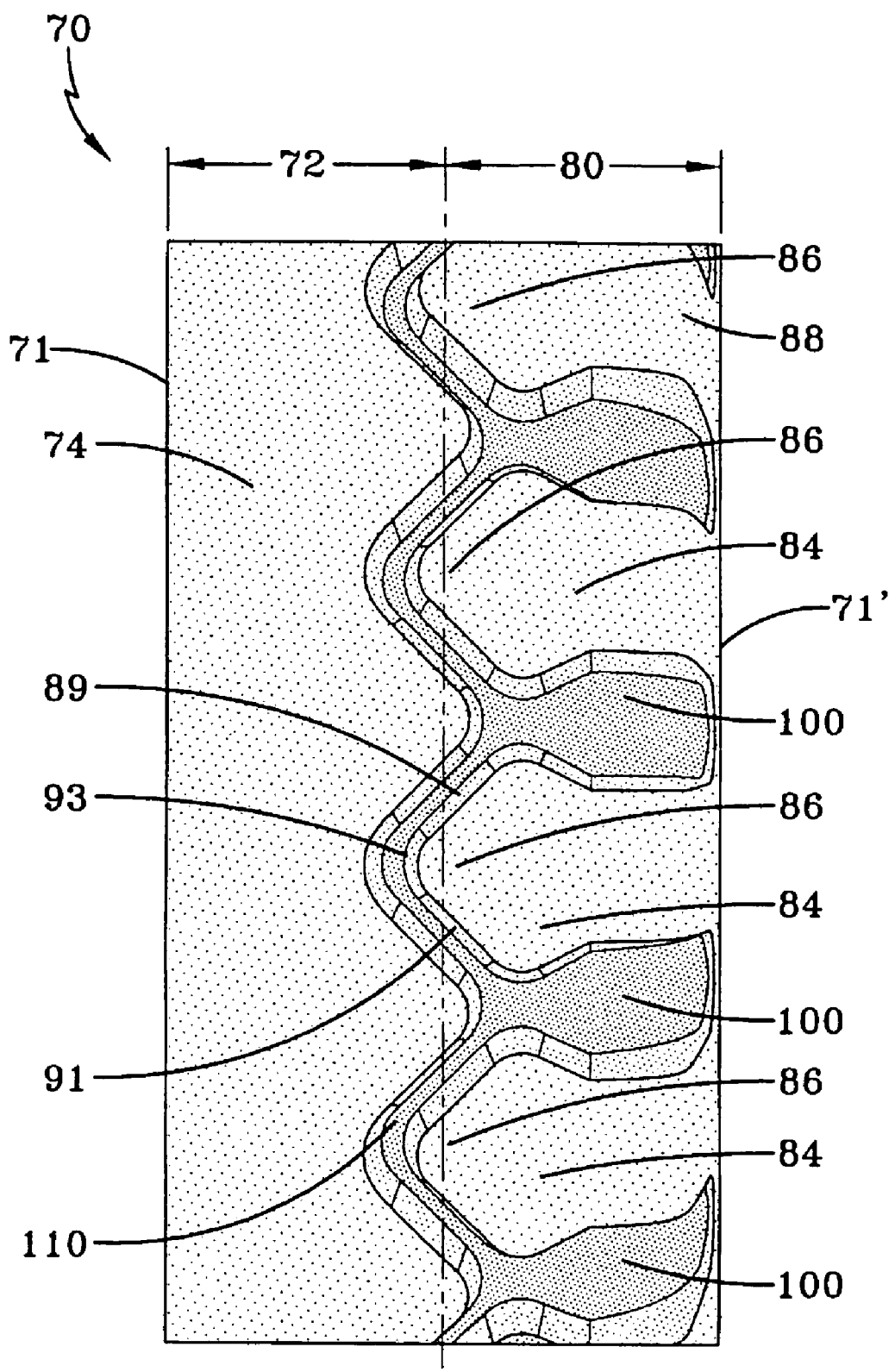
FIG. 6 is an enlarged fragmentary view of the tire according to the present invention.

An optional cleaning groove 110 joins the one or more grooves 100 together and functions to provide multiple pathways to extrude out mud or clear out debris. The cleaning groove 110 may be located on the dividing line between the first tread zone and the second tread zone. The cleaning groove 110 may be circumferentially straight or in the shape of an undulating groove as shown in FIG. 4. The cleaning groove 110 preferably forms a pathway around the lug head 84 and joins with the debris clearing grooves 100.

The net to gross ratio of the second tread zone 80 of the tire is in the range of about 40% to about 70%, and most preferably about 55%. The net to gross ratio of the first tread zone of the tire is in the range of about 75% to about 100%. The overall net to gross ratio of the tire is preferably in the range of about 60% to about 80%.

Figure 8:
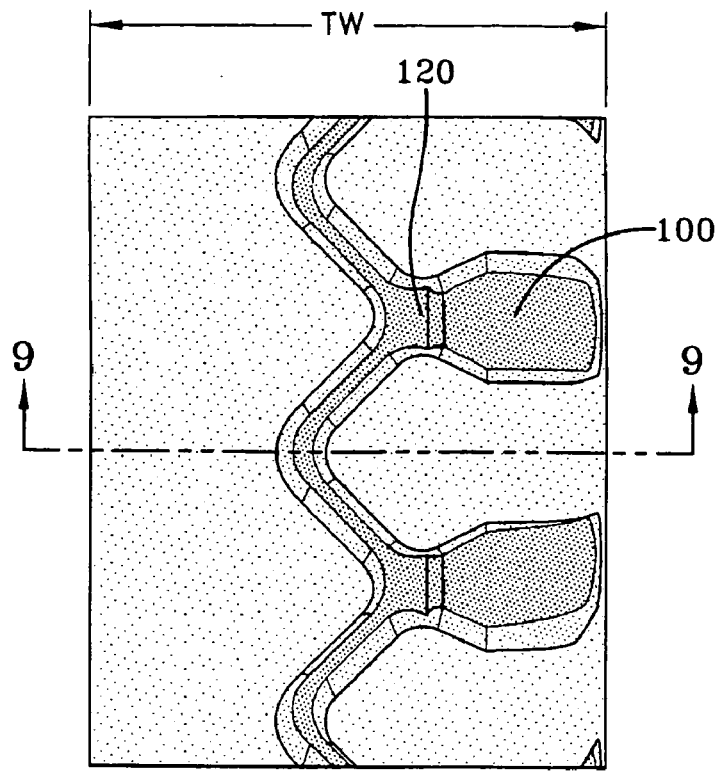
FIG. 8 is an enlarged plan view of a second embodiment of a drive tire of the invention.
Figure 9:
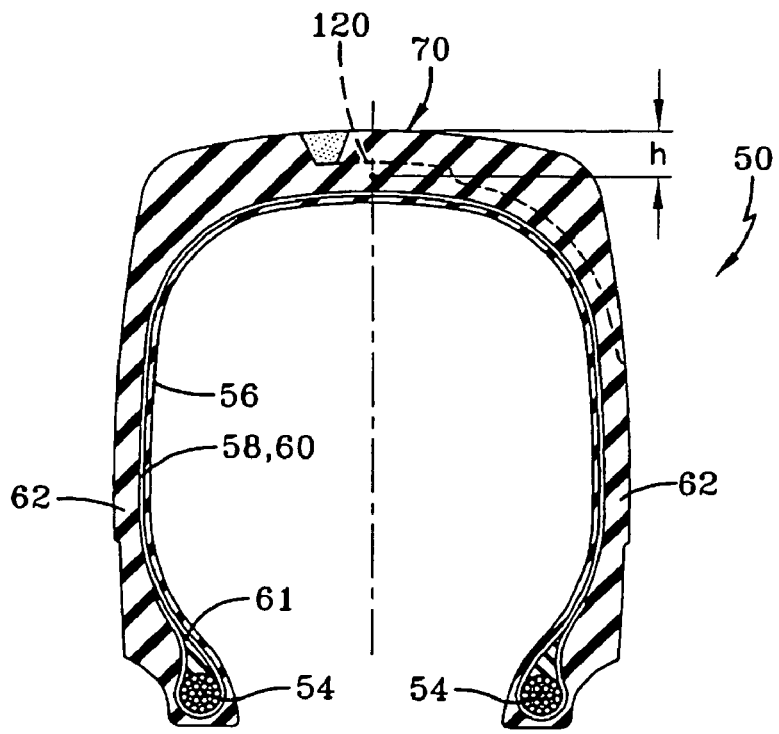
FIG. 9 is a cross-sectional view of the tire of FIG. 8 taken along lines 9-9.

As shown in FIG. 8, an optional tread shelf or lug reinforcement 120 may be disposed in the one or more soil discharge grooves of the second portion of the tire tread. This tread shelf 120 provides additional bracing support for the adjacent lugs and maintains the center of the tire in a more rigid circumferential resistance to hoop deflection. The tread shelf may preferably extend above the inner surface of the tread a distance of less than one half inch (2 cm).

The tire as described above, may be extremely small in section width depending upon the application, and in some cases, having a total section width in the range of about 4 inches (16 cm) to about 6 inches (24 cm). The tread width may be slightly smaller than the section width of the tire, which means that the entire tractive force of the drive tire must be achieved by the tread over a very narrow width.

In a first example of the tire, the tire size is 175/95D16, the lug centerline non-skid distance or lug height h is approximately 0.485 inches (1.2 cm). The lug extends radially outward increasing in depth to a maximum lug height of 0.668 inches (1.7 cm) at the shoulder, and the tread shelf itself has a depth of 0.15 inches (0.4 cm). In yet another embodiment of the invention, the drive tire has a substantially smooth outer tread surface.

While certain representative embodiments and details have been shown for the purpose of illustrating the invention, it will be apparent to those skilled in this art that various changes and modifications may be made therein without departing from the spirit or scope of the invention.

We claim:

1. A vehicle comprising
a first tire and second tire, each tire comprising: a pair of annular beads, a carcass reinforcing structure, an elastomeric sidewall extending radially outwardly from each bead adjacent the carcass reinforcing structure to a radially outer tread, the tread having only two circumferential tread zones which extend continuously around said tire, wherein said first circumferential tread zone has no lugs, and wherein said second circumferential tread zone comprises a plurality of lugs and a plurality of grooves which extend from a first end of said second tread zone to the sidewall, and a circumferentially continuous groove joining said plurality of grooves, wherein said tires are mounted within a rubber track having an interior center guide lug wherein the radially outer tread of the tire is in engagement with an interior surface of a rubber track and wherein the first tire and second tire are oppositely mounted on the vehicle such that the first zone of each tire is adjacent the center guide lug.

2. The vehicle of claim 1 wherein said first tread zone comprises in the range of about 25% to about 55% of the tread width.

3. The vehicle of claim 1 wherein said first tread zone has a net to gross ratio in the range of about 75% to about 100%.

4. The vehicle of claim 1 wherein each of said tires has a net to gross ratio in the range of about 60% to about 80%.

5. The vehicle of claim 1 wherein said first tread zone comprises a substantially smooth outer tread surface.

6. The vehicle of claim 1 wherein said tread further comprises radiused outer edges joining the sidewalls of the tire.

7. The vehicle of claim 1 wherein said plurality of grooves extend axially and have a width in the range of about 50% to about 100% of the lug base width at the shoulder.

8. The vehicle of claim 6 wherein said plurality of grooves extend axially from a first end to a second end of said second tread zone.

9. The vehicle of claim 1 wherein said circumferential groove is undulating.

10. The vehicle of claim 1 wherein a tread shelf extends radially outwardly from an inner tread surface of at least one groove.

11. The vehicle of claim 1 wherein each of said first and second tread zones extends from a shoulder edge to the centerline of the tread.

12. The vehicle of claim 1 wherein said lugs have a lug head and a shoulder portion, wherein the lug head width is greater than the shoulder portion width.

13. The vehicle of claim 12 wherein said first tread zone comprises in the range of about 25% to about 55% of the tread width.

14. The vehicle of claim 12 wherein said first tread zone has a net to gross ratio in the range of about 75% to about 100%.

15. The vehicle of claim 12 wherein said tread further comprises radiused outer edges joining the sidewalls of the tire.

16. The vehicle of claim 12 wherein said tread is radiused from sidewall to sidewall.

17. The vehicle of claim 12 wherein said circumferential groove is located on the centerline of said tire.

18. The vehicle of claim 12 wherein a tread shelf extends radially outwardly from an inner tread surface of at least one groove.

19. The vehicle of claim 12 wherein all of said plurality of grooves extend axially from a first end to the shoulder.

20. The vehicle of claim 12 wherein the lug head width is in the range of about 1.2 to about 1.6 times the shoulder portion width.

21. The vehicle of claim 12 wherein said circumferential groove has an undulating pattern.

22. The vehicle of claim 12 wherein said circumferential groove has a depth of about the non skid depth of the tire.

23. The vehicle of claim 12 wherein all of said plurality of grooves have a width in the range of about 50% to about 100% of the lug shoulder width.

* * * * *